US011955062B2

(12) United States Patent
Lin et al.

(10) Patent No.: US 11,955,062 B2
(45) Date of Patent: Apr. 9, 2024

(54) DISPLAY DRIVING METHOD AND APPARATUS, AND DISPLAY PANEL AND ELECTRONIC DEVICE

(71) Applicant: Chipone Technology (Beijing) Co., LTD., Beijing (CN)

(72) Inventors: Li-Tang Lin, Beijing (CN); Chia-Wei Su, Beijing (CN)

(73) Assignee: Chipone Technology (Beijing) Co., LTD., Beijing (CN)

( * ) Notice: Subject to any disclaimer, the term of this patent is extended or adjusted under 35 U.S.C. 154(b) by 0 days.

(21) Appl. No.: 17/955,663

(22) Filed: Sep. 29, 2022

(65) Prior Publication Data

US 2023/0022073 A1 Jan. 26, 2023

Related U.S. Application Data

(63) Continuation of application No. PCT/CN2021/091043, filed on Apr. 29, 2021.

(30) Foreign Application Priority Data

Jul. 29, 2020 (CN) ........................ 202010745402.X

(51) Int. Cl.
*G09G 3/32* (2016.01)
*G09G 3/36* (2006.01)

(52) U.S. Cl.
CPC ................. *G09G 3/32* (2013.01); *G09G 3/36* (2013.01); *G09G 2310/0243* (2013.01); *G09G 2310/08* (2013.01)

(58) Field of Classification Search
CPC .... G09G 3/32; G09G 3/36; G09G 2310/0243; G09G 2310/08; G09G 3/20; G09G 2320/0285; G09G 2320/0693; G09G 2354/00; G09G 3/3208; G06F 3/041
See application file for complete search history.

(56) References Cited

U.S. PATENT DOCUMENTS 7,746,313 B2 * 6/2010 Goto .................... G09G 3/3648
345/100

FOREIGN PATENT DOCUMENTS

| | | | |
|---|---|---|---|
| CN | 101071545 | A | 11/2007 |
| CN | 104361878 | A | 2/2015 |
| CN | 107045858 | A | 8/2017 |
| CN | 111883080 | A | 11/2020 |
| JP | 2007156080 | A | 6/2007 |
| JP | 2009230103 | A | 10/2009 |
| JP | 2018189942 | A | 11/2018 |

(Continued)

OTHER PUBLICATIONS

International Search Report, International Application No. PCT/CN2021/091043, dated Jul. 22, 2021 (4 Pages).

*Primary Examiner* — Andrew Sasinowski
(74) *Attorney, Agent, or Firm* — Occhiuti & Rohlicek LLP

(57) ABSTRACT

Provided are a display driving method and apparatus, and a display panel and an electronic device. The display driving method is applied to a display panel, and comprises: determining a first charging duration of each display point on the basis of a preset position, in a display panel, of each display point in the display panel; generating, according to the first charging duration of each display point, a display control signal corresponding to each display point; and adjusting a second charging duration of each display point according to the display control signal.

11 Claims, 4 Drawing Sheets

(56) References Cited

FOREIGN PATENT DOCUMENTS

| | | | |
|---|---|---|---|
| KR | 10-2015-0061755 | A | 6/2015 |
| KR | 10-2019-0029053 | A | 3/2019 |

* cited by examiner

DISPLAY DRIVING METHOD AND APPARATUS, AND DISPLAY PANEL AND ELECTRONIC DEVICE

The present application is a continuation of and claims priority under 35 U.S.C. 120 to PCT application No. PCT/CN2021/091043 filed on Apr. 29, 2021, which claims priority to Chinese Patent Application No. 202010745402.X, filed on Jul. 29, 2020, entitled "DISPLAY DRIVING METHOD AND APPARATUS, AND DISPLAY PANEL AND ELECTRONIC DEVICE", the entire contents of which are incorporated herein by reference.

TECHNICAL FIELD

The present disclosure relates to the field of display technology, and in particular to a display driving method and device, a display panel, and an electronic apparatus.

BACKGROUND

With the development of electronic industry, display panels have become an important part of existing display equipment. The display panel includes a display driver chip and a plurality of display points. The display panel controls the activation of each display point through display control signals of the display driver chip.

As the size, resolution, and refresh rate of the display panel increase, the effective interval of the display control signal becomes shorter and shorter. Moreover, the time during which the display control signal is output by the existing display panel remains constant. However, since the circuit loads (such as resistive and capacitive loads) corresponding to the display points at different positions are inconsistent, the potential states reached by the display points at different positions within the same period of time are not consistent, thereby affecting the display effect.

SUMMARY

In view of the above, the present disclosure provides a display driving method, applied to a display panel, and the method comprises:

- determining a first charging duration of each of display points in the display panel based on a preset position of each of the display points in the display panel;
- generating a display control signal corresponding to each of the display points based on the first charging duration of each of the display points; and
- adjusting a second charging duration of each of the display points based on the display control signal.

In a possible implementation, determining the first charging duration of each of the display points comprises:

- determining a distance between each of the display points and a display driver chip in the display panel based on a circuit configuration of the display panel, wherein the circuit configuration includes a configuration manner of circuit elements in the display panel; and
- determining the first charging duration of each of the display points based on the distance between each of the display points and the display driver chip in the display panel.

In a possible implementation, generating the display control signal corresponding to each of the display points comprises:

- based on the first charging duration of each of the display points, generating the display control signal corresponding to each of the display points by means of a correspondence between a preset charging duration and the display control signal.

In a possible implementation, the first charging duration and the second charging duration of each of the display points are within a time range where a valid interval of the display control signal lies, wherein the valid interval includes a rising edge interval or a falling edge interval of the display control signal.

Another aspect of the present disclosure provides a display driving device, applied to a display panel, and the display driving device comprises:

- a time duration determination module configured to determine a first charging duration of each of display points in the display panel based on a preset position of each of the display points in the display panel;
- a signal generation module configured to generate a display control signal corresponding to each of the display points based on the first charging duration of each of the display points; and
- a control start module configured to adjust a second charging duration of each of the display points based on the display control signal.

In a possible implementation, the duration determination module is further configured to:

- determine a distance between each of the display points and a display driver chip in the display panel based on a circuit configuration of the display panel, wherein the circuit configuration includes a configuration manner of circuit elements in the display panel; and
- determine the first charging duration of each of the display points based on the distance between each of the display points and the display driver chip in the display panel.

In a possible implementation, generating, by the signal generation module, the display control signal corresponding to each of the display points comprises:

- based on the first charging duration of each of the display points, generating the display control signal corresponding to each of the display points by means of a correspondence between a preset charging duration and the display control signal.

In a possible implementation, the first charging duration and the second charging duration of each of the display points are within a time range where a valid interval of the display control signal lies, wherein the valid interval includes a rising edge interval or a falling edge interval of the display control signal.

Another aspect of the present disclosure provides a display panel, and the display panel comprises:

- a display component; and
- the display driving device as described above.

In a possible implementation, the display component comprises at least one of a liquid crystal display component, a light emitting diode display component, an Organic Light Emitting Diode (OLED) display component, a quantum dot, a mini LED, a Micro LED, or a Micro OLED.

Another aspect of the present disclosure provides an electronic apparatus, wherein the electronic apparatus comprises the display panel as described above.

The display driving methods according to the embodiments of the present disclosure enable it possible to generate a display control signal corresponding to each of display points based on the first charging duration of each of the display points, and adjust a second charging duration of each of the display points, thereby ensuring consistency in display of the display panel.

Additional features and aspects of the present disclosure will become apparent from the following detailed description of exemplary embodiments with reference to the drawings.

BRIEF DESCRIPTION OF THE DRAWINGS

The drawings, which are incorporated in and constitute part of the specification, show the exemplary embodiments, features, and aspects of the present disclosure, and are used to explain the principle of the present disclosure together with the specification.

DETAILED DESCRIPTION

Figure 1:
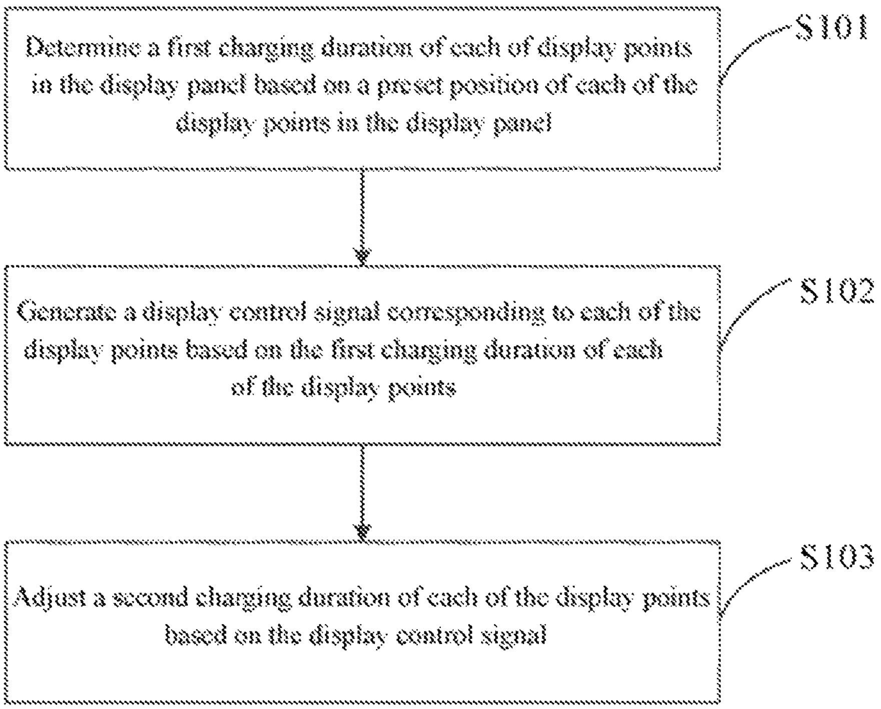
FIG. 1 shows a flowchart of a display driving method according to an embodiment of the present disclosure.

Various exemplary embodiments, features, and aspects of the present disclosure will be described in detail with reference to the drawings. The same reference numerals in the drawings represent parts having the same or similar functions. Although various aspects of the embodiments are shown in the drawings, the drawings are not necessarily drawn to scale unless otherwise specified.

Herein the specific term "exemplary" means "used as an example, or embodiment, or explanatory". An "exemplary" embodiment given here is not necessarily construed as being superior to or better than other embodiments.

In addition, numerous details are given in the following specific embodiments for the purpose of better explaining the present disclosure. It should be understood by a person skilled in the art that the present disclosure can still be realized even without some of those details. In some of the examples, methods, means, units, and circuits that are well known to a person skilled in the art are not described in detail so that the principle of the present disclosure becomes apparent.

In a possible implementation, the display panel according to an embodiment of the present disclosure may include a display driver chip, a plurality of display points, and a display component. The display driver chip may include a touch control chip, and the touch control chip may be applied to a touch control terminal. The number of display points may correspond to the resolution of the display panel. The display component may include at least one of a liquid crystal display component, a light emitting diode display component, and an Organic Light Emitting Diode (OLED) display component. It is to be noted that the embodiments of the present disclosure do not limit the types of the display panel, the display driver chip, the display points, and the display component.

In a possible implementation, the display driving method according to an embodiment of the present disclosure may be applied to the display driver chip of the display panel. Exemplarily, the display driving method according to an embodiment of the present disclosure may be implemented by a dedicated hardware circuit that may include a plurality of computing units, such as adders and multipliers; or may be implemented by general-purpose processing hardware, such as a Microcontroller Unit (MCU) or a Field Programmable Gate Array (FPGA), in conjunction with executable logic instructions, to execute the corresponding working process. The present disclosure is not limited thereto.

FIG. 1 shows a flowchart of a display driving method according to an embodiment of the present disclosure. The display driving method according to an embodiment of the present disclosure may be applied to a display panel, as shown in FIG. 1, and the method comprises:

Step S101, determining a first charging duration of each of display points in the display panel based on a preset position of each of the display points in the display panel;

Step S102, generating a display control signal corresponding to each of the display points based on the first charging duration of each of the display points; and Step S103, adjusting a second charging duration of each of the display points based on the display control signal.

In a possible implementation, the first charging duration may be determined based on the preset position of each of the display points in the display panel; the second charging duration may comprise charging durations for the display points at different positions to reach their corresponding target potentials; and the first charging duration may be equal to the second charging duration. The embodiments of the present disclosure do not limit the types of the first and second charging durations.

In a possible implementation, in Step S101, since the circuit loads (such as resistive and capacitive loads) corresponding to the display points at different positions of the display panel are inconsistent, the first charging durations of the display points at different positions may be different. Accordingly, the charging durations, i.e., the second charging durations, taken by the display points at different positions of the display panel to reach their corresponding target potentials may be different. It is to be noted that the target potentials corresponding to the display points may or may not be the same, which is not limited in the embodiments of the present disclosure.

Figure 2:
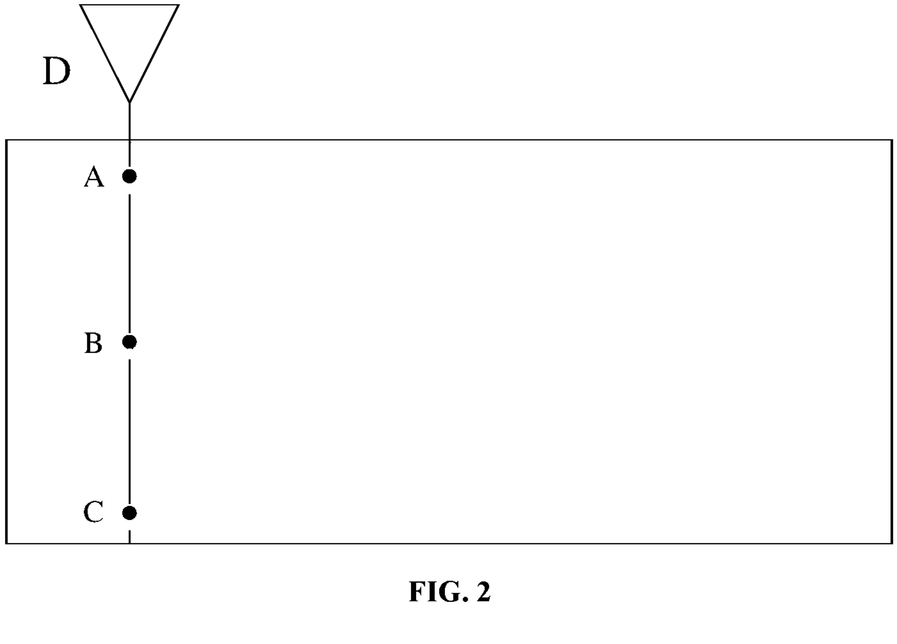
FIG. 2 shows a schematic diagram of the architecture of a display panel according to an embodiment of the present disclosure.

FIG. 2 shows a schematic diagram of the architecture of a display panel according to an embodiment of the present disclosure. As shown in FIGS. 2, A, B, and C represent different display points respectively, and D may represent an amplifier. Exemplarily, the circuit load is a resistive and capacitive load, for example. The closer the distance between the display point and the display driver chip, the smaller the resistive and capacitive load corresponding to the display point is, and the shorter the duration required to reach its corresponding target potential may be. Accordingly, the longer the distance between the display point and the display driver chip, the larger the resistive and capacitive load corresponding to the display point is, and the longer the duration required reaching its corresponding target potential may be.

In a possible implementation, the larger the resistive and capacitive load corresponding to each of the display points, the longer the second charging time for each of the display points to reach its corresponding target potential may be; the smaller the resistive and capacitive load corresponding to each of the display points, the shorter the second charging duration for each of the display points to reach its corresponding target potential may be. The display points in the display panel are A and B, for example. It is assumed that the display point A is closer to the display driver chip, the display point B is farther from the display driver chip, and the target potentials of the display point A and the display point B are the same. Then the second charging duration for the display point A to reach the target potential from 0V may be 1 us, and the second charging duration for the display point B to reach the target potential from 0V may be 3 us. It is to be noted that the target potentials corresponding to the display points may be different and the resistive and capacitive loads corresponding to different display points are different, but the second charging durations taken to reach their corresponding target potentials may be the same. The embodiments of the present disclosure are not limited thereto.

Exemplarily, based on the preset position of each of the display points in the display panel, the first charging duration of each of the display points may be determined based on the historical data or by means of real-time measurement. The embodiments of the present disclosure do not limit the implementation of determining the first charging duration of each of the display points.

By determining the first charging duration of each of the display points based on the preset position of each of the display points in the display panel, the output time of the display control signals corresponding to the display points can be dynamically adjusted, such that each of the display points reaches its corresponding target potential.

Figure 3:
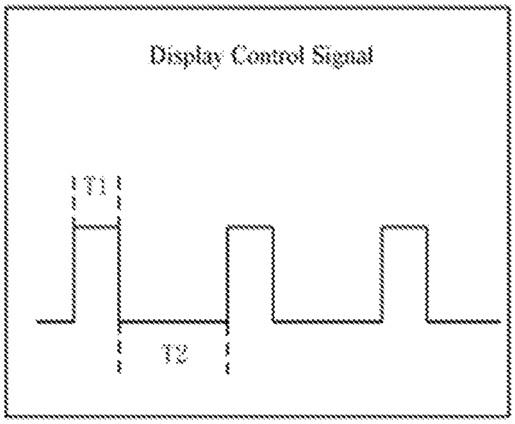
FIG. 3 shows a schematic diagram of a display control signal according to an embodiment of the present disclosure.

In a possible implementation, in Step S102, each of the display points has a corresponding display control signal. The display control signal may include a square wave signal. FIG. 3 shows a schematic diagram of a display control signal according to an embodiment of the present disclosure. In FIG. 3, T1 may represent a rising edge interval, and T2 may represent a falling edge interval. It is to be noted that the embodiments of the present disclosure do not limit the specific form of the display control signal.

Each of the display points has a corresponding display control signal, and each of the display points may be accurately regulated by the display control signal, thereby the display effect of the display panel may be guaranteed.

In a possible implementation, in Step S103, when the display control signal reaches the corresponding display point, this display point enables charging. The second charging duration of each of the display points can be adjusted based on the display control signal.

Exemplarily, based on the display control signal corresponding to each of the display points, the second charging duration of each of the display points may be controlled to be within the time range in which the valid interval of the display control signal lies.

The valid interval of the display control signal includes, but is not limited to, a rising edge interval or a falling edge interval of the display control signal.

Exemplarily, the first charging duration of each of the display points may be preset. The embodiments of the present disclosure do not limit the implementation of setting the first charging duration of each of the display points. As shown in FIG. 3, T1 may represent the time range where the rising edge interval lies, and T2 may represent the time range where the falling edge interval lies. In practical applications, as the size, resolution, and refresh rate of the display panel increase, the valid interval of the display control signal (the rising or falling edge interval of the display control signal) becomes shorter and shorter, while the display point may raise or lower the potential within the time range of the valid interval.

For example, when the potential of the display point is raised within the time range of the valid interval, some of the display points farther from the display driver chip cannot reach their corresponding preset potentials within the time range of the valid interval, which eventually leads to inconsistent display effect of the entire display panel. The preset potentials may be the potentials that the display points are desired to reach, and the preset potentials may be the same to or different from the target potentials, which is not limited in the embodiments of the present disclosure. This problem can be effectively overcome by controlling the second charging duration of each of the display points based on the display control signal as follows.

In a possible implementation, for example, A, B, and C are display points and the time range of the valid interval is 3.5 us, for example. It is assumed that the preset potentials of the display points A, B, and C are the same and all are 8V, the display point A is closest to the display driver chip, the display point B comes second, and the display point C is farthest from the display driver chip. Then the second charging duration for the display point A to reach the preset potential is 1 us, the second charging duration for the display point B to reach the preset potential is 2 us, and the second charging duration for the display point C to reach the preset potential is 3 us. By controlling the second charging duration of each of the display points based on the display control signal, it is possible to eliminate the undesirable impact that the display effect of the entire display panel is inconsistent due to the display points at a relatively long distance from the display driver chip being unable to reach the preset potentials within the time range of the valid interval.

Exemplarily, since the display point C is farthest from the display driver chip, the resistive and capacitive load is larger accordingly, and the display point C may be unable to reach the preset potential. Within the time range of the valid interval, the potential that can be achieved by the display point C may be 7.5V. However, the other two display points can reach the preset potentials within the time range of the valid interval because they are closer to the display driver chip. In order to ensure that the display effect of the entire display panel is consistent, the second charging durations of the other two display points may be controlled, such that the final potentials of the display points A, B, and C are all 7.5V within the time range of the valid interval.

Figure 4:
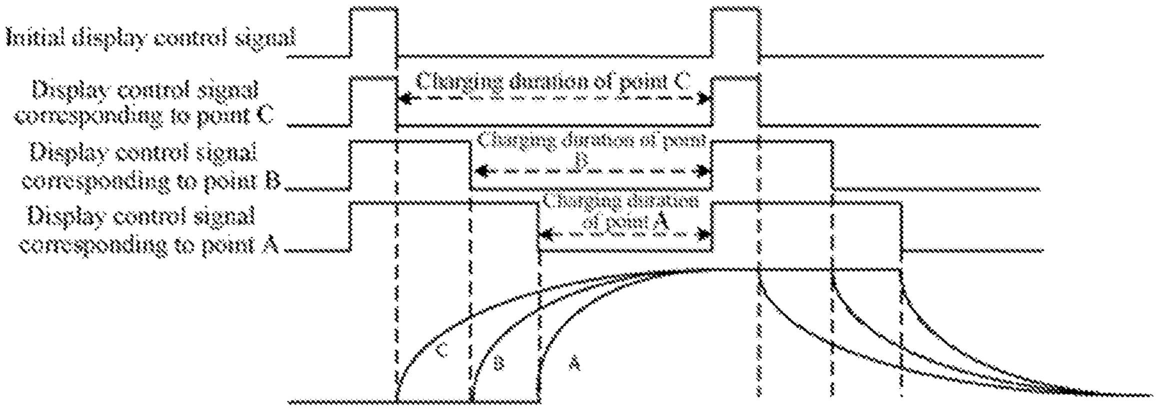
FIG. 4 shows a schematic diagram of the correspondence between display control signals and potential changes according to an embodiment of the present disclosure.

FIG. 4 shows a schematic diagram of the correspondence between display control signals and potential changes according to an embodiment of the present disclosure. As shown in FIG. 4, the display point C may be controlled to start charging at the time when the display point C receives its corresponding display control signal; the display point B may be controlled to start charging with a delay of 1 us after the display point B receives its corresponding display control signal; and the display point A is controlled to start charging with a delay of 2 us after the display point A receives its corresponding display control signal, so as to guarantee that the display points A, B, and C can all reach the same target potential within the time range in which the effect interval is located.

Besides, the time length of the valid interval of the display control signal may be further controlled based on the second charging duration of each of the display points. Exemplarily, if the time required by the display point A to reach the preset potential of 8V is 1 us, then the time length of the valid interval of the display control signal may be changed to 0.8 us, so that the final potential of the display point A is 7.5V.

By adjusting the second charging duration of each of the display points based on the display control signal, not only the image display quality of the display panel can be improved, but also the temperature and electromagnetic interference of the display panel can be effectively reduced.

In a possible implementation, determining the first charging duration of each of the display points comprises:

- determining a distance between each of the display points and a display driver chip in the display panel based on a circuit configuration of the display panel; and
- determining the first charging duration of each of the display points based on the distance between each of the display points and the display driver chip in the display panel.

Exemplarily, the first charging duration of each of the display points may be determined based on the distance between each of the display points and the display driver chip in the display panel. The first charging duration of each of the display points may be determined by looking up historical data or real-time measurement. The embodiments of the present disclosure do not limit to the implementation of determining the first charging duration of each of the display points.

For example, the display points in the display panel are A and B. It is assumed that the display point A is closer to the display driver chip and the display point B is farther from the display driver chip. The first charging durations of the display points A and B may be determined by real-time measurement. For example, the first charging durations of the display points A and B may be measured directly by a meter. The embodiments of the present disclosure do not limit the implementation of determining the first charging duration of each of the display points.

In a possible implementation, in Step S102, generating the display control signal corresponding to each of the display points comprises:

- based on the first charging duration of each of the display points, generating the display control signal corresponding to each of the display points by means of a correspondence between a preset charging duration and the display control signal.

Exemplarily, the correspondence between the charging duration and the display control signal may be stored in advance in the display driver chip of the display panel. The form embodying the correspondence between the charging duration and the display control signal may include program codes. The embodiments of the present disclosure do not limit the specific form of the correspondence between the charging duration and the display control signal.

Based on the correspondence between the charging duration and the display control signal as well as the first charging duration of each of the display points, the display control signal corresponding to each of the display points can be determined quickly and accurately, thereby accurately regulating each of the display points to ensure the display effect of the display panel.

In the display driving method according to an embodiment of the present disclosure, the first charging duration of each of the display points is determined based on the preset position of each of the display points in the display panel, the display control signal corresponding to each of the display points is generated based on the first charging duration, and the second charging time of each of the display points is adjusted, so as to ensure the consistency in display of the display panel. By controlling the time for each of the display points to reach its corresponding target potential to be within the preset time range based on the display control signal, the image display quality of the display panel is improved, and the temperature and electromagnetic interference of the display panel are effectively reduced as well.

Figure 5:
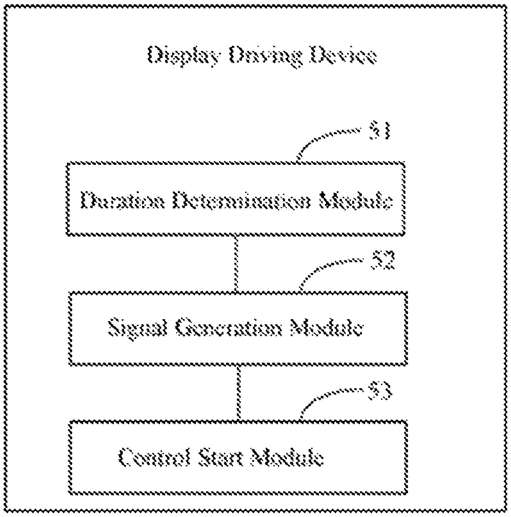
FIG. 5 shows a schematic structural diagram of a display driving device according to an embodiment of the present disclosure.

FIG. 5 shows a schematic structural diagram of a display driving device according to an embodiment of the present disclosure. The display driving device is applied to a display panel, and the display driving device comprises:

- a duration determination module 51 configured to determine a first charging duration of each of display points in the display panel based on a preset position of each of the display points in the display panel;
- a signal generation module 52 configured to generate a display control signal corresponding to each of the display points based on the first charging duration of each of the display points; and
- a control start module 53 configured to adjust a second charging duration of each of the display points based on the display control signal.

In a possible implementation, the duration determination module 51 is further configured to:

- determine a distance between each of the display points and a display driver chip in the display panel based on a circuit configuration of the display panel, wherein the circuit configuration includes a configuration manner of circuit elements in the display panel; and
- determine the first charging duration of each of the display points based on the distance between each of the display points and the display driver chip in the display panel.

In a possible implementation, generating, by the signal generation module 52, the display control signal corresponding to each of the display points comprises:

- based on the first charging duration of each of the display points, generating the display control signal corresponding to each of the display points by means of a correspondence between a preset charging duration and the display control signal.

In a possible implementation, the first charging duration and the second charging duration of each of the display points are within a time range in which a valid interval of the display control signal is located, wherein the valid interval includes a rising edge interval or a falling edge interval of the display control signal.

Figure 6:
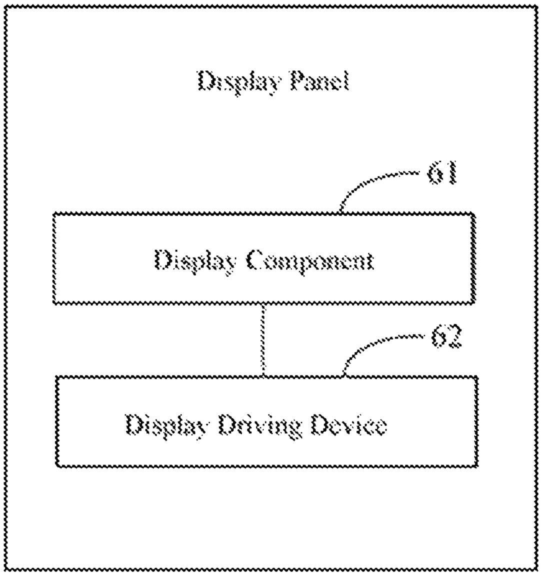
FIG. 6 shows a schematic structural diagram of a display panel according to an embodiment of the present disclosure.

FIG. 6 shows a schematic structural diagram of a display panel according to an embodiment of the present disclosure. As shown in FIG. 6, the display panel may comprise:

- a display component 61; and
- the display driving device 62 described in the embodiment corresponding to FIG. 5.

In a possible implementation, the display component 61 comprises at least one of a liquid crystal display component, a light emitting diode display component, an Organic Light Emitting Diode (OLED) display component, a quantum dot, a mini Light Emitting Diode (LED), a Micro LED, or a Micro OLED.

In a possible implementation, the display component 61 may comprise a Liquid Crystal Display (LCD) and a Touch Panel (TP). If the display component 61 comprises a touch panel, the display component 61 may be implemented as a touch screen to receive input signals from the user. The touch panel comprises one or more touch sensors to sense the touch, sliding, and gestures on the touch panel. The touch sensor may not only sense a boundary of the touch or sliding operation, but also detect the duration and pressure related to the touch or sliding operations.

Figure 7:
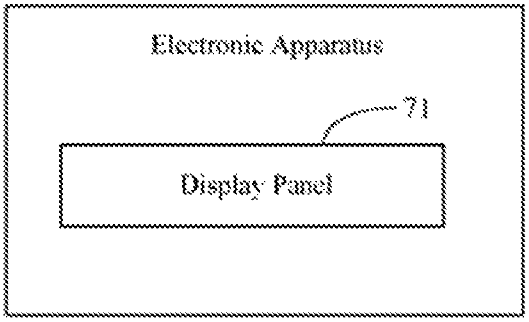
FIG. 7 shows a schematic structural diagram of an electronic apparatus according to an embodiment of the present disclosure.

FIG. 7 shows a schematic structural diagram of an electronic apparatus according to an embodiment of the present disclosure. As shown in FIG. 7, the electronic apparatus may comprise:

the display panel 71 described in the embodiment corresponding to FIG. 6.

The present disclosure may be implemented by a system, a method, and/or a computer program product. The computer program product may include a computer readable storage medium having computer-readable program instructions for causing a processor to carry out all aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: a portable computer diskette, a hard disk, a Random Access Memory (RAM), a Read-Only Memory (ROM), an Erasable Programmable Read-Only Memory (EPROM or Flash memory), a Static Random-Access Memory (SRAM), a portable Compact Disc Read-Only Memory (CD-ROM), a Digital Versatile Disk (DVD), a memory stick, a floppy disk, a mechanically encoded device (for example, punch-cards or raised structures in a groove having instructions recorded thereon), and any proper combination thereof. A computer readable storage medium referred to herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network, and/or wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, Instruction-Set-Architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including Local Area Network (LAN) or Wide Area Network (WAN), or connected to an external computer (for example, through the Internet connection from an Internet Service Provider). In some embodiments, electronic circuitry, such as programmable logic circuitry, Field-Programmable Gate Arrays (FPGA), or Programmable Logic Arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can all be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, and these instructions cause a computer, a programmable data processing device, and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices, or other devices implement the functions/acts specified in one or more blocks in the flowchart and/or block diagram.

The flowcharts and block diagrams in the drawings illustrate the architecture, function, and operation that may be implemented by the system, method, and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

Although the embodiments of the present disclosure have been described above, it will be appreciated that the above descriptions are merely exemplary, but not exhaustive; and that the disclosed embodiments are not limiting. A number of variations and modifications may occur to a person skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to a person skilled in the art.

What is claimed is:

1. A display driving method, applied to a display panel, comprising:

determining a first charging duration of each of display points in the display panel based on a preset position of each of the display points in the display panel;

generating a display control signal corresponding to each of the display points based on the first charging duration of each of the display points; and adjusting a second charging duration of each of the display points based on the display control signal.

2. The method according to claim 1, wherein determining the first charging duration of each of the display points comprises:

determining a distance between each of the display points and a display driver chip in the display panel based on a circuit configuration of the display panel, wherein the circuit configuration includes a configuration manner of circuit elements in the display panel; and determining the first charging duration of each of the display points based on the distance between each of the display points and the display driver chip in the display panel.

3. The method according to claim 1, wherein generating the display control signal corresponding to each of the display points comprises:

based on the first charging duration of each of the display points, generating the display control signal corresponding to each of the display points by means of a correspondence between a preset charging duration and the display control signal.

4. The method according to claim 1, wherein the first charging duration and the second charging duration of each of the display points are within a time range where a valid interval of the display control signal lies, wherein the valid interval includes a rising edge interval or a falling edge interval of the display control signal.

5. A display driving device, applied to a display panel, comprising:

a duration determination module configured to determine a first charging duration of each of display points in the display panel based on a preset position of each of the display points in the display panel;

a signal generation module configured to generate a display control signal corresponding to each of the display points based on the first charging duration of each of the display points; and a control start module configured to adjust a second charging duration of each of the display points based on the display control signal.

6. The device according to claim 5, wherein the duration determination module is further configured to:

determine a distance between each of the display points and a display driver chip in the display panel based on a circuit configuration of the display panel, wherein the circuit configuration includes a configuration manner of circuit elements in the display panel; and determine the first charging duration of each of the display points based on the distance between each of the display points and the display driver chip in the display panel.

7. The device according to claim 5, wherein the signal generation module generates, based on the first charging duration of each of the display points, the display control signal corresponding to each of the display points based on a correspondence between a preset charging duration and the display control signal.

8. The device according to claim 5, wherein the first charging duration and the second charging duration of each of the display points are within a time range where a valid interval of the display control signal lies, wherein the valid interval includes a rising edge interval or a falling edge interval of the display control signal.

9. A display panel, comprising:

a display component; and a display driving device applied to the display panel, comprising:

a duration determination module configured to determine a first charging duration of each of display points in the display panel based on a preset position of each of the display points in the display panel;

a signal generation module configured to generate a display control signal corresponding to each of the display points based on the first charging duration of each of the display points; and a control start module configured to adjust a second charging duration of each of the display points based on the display control signal.

10. The display panel according to claim 9, wherein the display component comprises at least one of a liquid crystal display component, a light emitting diode display component, an Organic Light Emitting Diode (OLED) display component, a quantum dot, a mini Light Emitting Diode (LED), a Micro LED, or a Micro OLED.

11. An electronic apparatus, comprising a display panel, wherein the display panel comprises a display component and a display driving device applied to the display panel comprising:

a duration determination module configured to determine a first charging duration of each of display points in the display panel based on a preset position of each of the display points in the display panel;

a signal generation module configured to generate a display control signal corresponding to each of the display points based on the first charging duration of each of the display points; and a control start module configured to adjust a second charging duration of each of the display points based on the display control signal.

* * * * *